United States Patent
Elson et al.

(10) Patent No.: US 9,656,887 B2
(45) Date of Patent: May 23, 2017

(54) REMOVAL OF IONS FROM AQUEOUS FLUID

(71) Applicant: The Water Company, Pueblo, CO (US)

(72) Inventors: Brian B. Elson, Pueblo, CO (US); Michael Fallbach, Woodland Park, CO (US)

(73) Assignee: THE WATER COMPANY, Pueblo, CO (US)

( * ) Notice: Subject to any disclaimer, the term of this patent is extended or adjusted under 35 U.S.C. 154(b) by 502 days.

(21) Appl. No.: 14/061,544

(22) Filed: Oct. 23, 2013

(65) Prior Publication Data

US 2014/0116954 A1     May 1, 2014

Related U.S. Application Data

(60) Provisional application No. 61/718,247, filed on Oct. 25, 2012.

(51) Int. Cl.

| | | |
|---|---|---|
| *C02F 1/52* | (2006.01) | |
| *B01D 21/01* | (2006.01) | |
| *B01D 37/00* | (2006.01) | |
| *C02F 1/38* | (2006.01) | |
| *C01F 7/74* | (2006.01) | |
| *C01F 11/46* | (2006.01) | |
| *C01F 7/76* | (2006.01) | |
| *C02F 1/24* | (2006.01) | |

(Continued)

(52) U.S. Cl.
CPC ............ *C02F 1/5245* (2013.01); *B01D 21/01* (2013.01); *C01F 7/74* (2013.01); *C01F 7/741* (2013.01); *C01F 7/767* (2013.01); *C02F 1/24* (2013.01); *C02F 1/38* (2013.01); *C02F 1/461* (2013.01); *C02F 1/56* (2013.01); *C02F 1/66* (2013.01); *C01F 11/46* (2013.01); *C02F 1/4618* (2013.01); *C02F 1/46114* (2013.01); *C02F 1/687* (2013.01); *C02F 2001/46133* (2013.01); *C02F 2001/46161* (2013.01); *C02F 2101/20* (2013.01); *C02F 2103/06* (2013.01); *C02F 2103/10* (2013.01)

(58) Field of Classification Search
None
See application file for complete search history.

(56) References Cited

U.S. PATENT DOCUMENTS 4,243,429 A * 1/1981 Tamura ..................... C01F 7/76
                                                    106/18.12
5,069,800 A * 12/1991 Murphy ................... C02F 1/705
                                                    210/749

(Continued)

FOREIGN PATENT DOCUMENTS

DE     EP 0584502 A2 *  3/1994   ................ C01F 7/76
WO     WO 2014/066603 A1   5/2014

OTHER PUBLICATIONS

Bosman et al. (Abstracts of the International Mine Water Conference, 2009, pp. 849-857.*

(Continued)

*Primary Examiner* — Clare Perrin
(74) *Attorney, Agent, or Firm* — Cooley LLP (57) ABSTRACT

Methods of removing one or more oxyanions from an aqueous fluid can comprise increasing the pH of an aqueous fluid containing one or more oxyanions and contacting the aqueous fluid with aluminum metal.

35 Claims, 1 Drawing Sheet

(51) Int. Cl.
*C02F 1/461* (2006.01)
*C02F 1/56* (2006.01)
*C02F 1/66* (2006.01)
B01D 21/00 (2006.01)
C02F 1/00 (2006.01)
B03D 3/00 (2006.01)
C01F 7/00 (2006.01)
C01F 11/00 (2006.01)
C02F 1/68 (2006.01)
C02F 101/20 (2006.01)
C02F 103/06 (2006.01)
C02F 103/10 (2006.01)

(56) References Cited

U.S. PATENT DOCUMENTS

| | | | |
|---|---|---|---|
| 5,419,883 A | 5/1995 | Ogawa et al. | |
| 5,547,588 A * | 8/1996 | Hassett | C02F 1/5236 |
| | | | 210/724 |
| 5,558,847 A | 9/1996 | Kaaber et al. | |
| 5,954,937 A | 9/1999 | Farmer | |
| 6,280,630 B1 * | 8/2001 | Ramsay | C02F 1/52 |
| | | | 210/711 |
| 6,746,592 B1 | 6/2004 | Mok et al. | |
| 2003/0160003 A1 * | 8/2003 | Maree | C02F 1/5236 |
| | | | 210/724 |
| 2005/0126928 A1 | 6/2005 | Hung et al. | |
| 2005/0183964 A1 | 8/2005 | Roberts et al. | |
| 2007/0036702 A1 * | 2/2007 | Huege | C01F 7/74 |
| | | | 423/117 |
| 2008/0078673 A1 | 4/2008 | Elson et al. | |
| 2009/0045074 A1 | 2/2009 | Hoover et al. | |
| 2011/0031130 A1 * | 2/2011 | Pastacaldi | C02F 1/5245 |
| | | | 205/516 |
| 2012/0261347 A1 | 10/2012 | Hassler et al. | |
| 2013/0319951 A1 * | 12/2013 | Smith | C02F 1/5245 |
| | | | 210/722 |

OTHER PUBLICATIONS

Grzmil et al. (Desalination, 2006, 189, 261-268).*
International Patent Application No. PCT/US2013/066551, International Search Report and Written Opinion mailed Mar. 10, 2014, 6 pages.
International Patent Application No. PCT/US2013/066551, International Preliminary Report on Patentability mailed Apr. 28, 2015, 6 pages.

* cited by examiner

REMOVAL OF IONS FROM AQUEOUS FLUID

BACKGROUND

Aqueous fluids, such as waste water, acid mine tailings, groundwater, and the like, can have high concentrations of various ions which can pose significant environmental and health hazards. Thus, removal of ions from aqueous fluids can be required by statute, rule, or regulation before disposal or use of such aqueous fluids.

Dissolved ions can be precipitated from aqueous fluids as ionic compounds, which can then be separated from the aqueous fluids. One class of ionic compounds that can be precipitated is ettringites. Ettringites, which are commercially useful components of cements, such as Portland cement, are hydrous calcium aluminum sulfate minerals, which can include a mineral with the chemical formula $Ca_6Al_2(SO_4)_3(OH)_{12} \cdot 26H_2O$ and a series of chemically analogous isostructural compounds. For instance, all or part of the aluminum can be substituted with one or more trivalent metal cations such as Fe (III), Mn(III), and Cr (III), all or part of the calcium can be substituted with one or more divalent metals, such as $Mg^{2+}$, all or part of the hydroxide can be substituted with one or more monovalent anions ions, such as chloride, fluoride, iodide, and bromide, and all or part of the sulfate can be substituted with one or more other oxyanions, such as chromate, selenate, borate, and carbonate. As an example, a boron containing ettringite can have a borate oxyanion in place of one or more sulfate anions. Also, the amount of water of hydration may vary somewhat.

Although the general definition of ettringite discussed above is often accepted, ettringites can also be defined more specifically as compounds with the formula $Ca_6M_2(OH)_x(A)_y(D)_z \cdot E(H_2O)$, wherein M is one or more trivalent metals, A is one or more oxyanions with one or more charges n-, D is one or more monovalent anions with charge 1-, E is 26 or 32, n is 1, 2, 3, or 4, and x, y, and z are defined such that $x+(y \cdot n)+z=18$, $x>0$, $y>0$, and $z \geq 0$. When an ettringite contains more than one oxyanion A with different charges n-, then (y)(n) is the sum of the value y for each oxyanion A multiplied by the n values for each respective oxyanion. For example, if A is $(VO_4)(ClO_3)_3$, wherein $VO_4$ has a charge of 3-(n=3) and $ClO_3$ has a charge of 1-(n=1), then (y)(n) is (1)(3)+(3)(1)=6. The values of x, y, and z are often integers, although this is not required unless otherwise specified. The values of x, y, and z can be defined such that z is 0, x is 12, and (y·n) is 6, although this is also not required unless otherwise specified.

Examples of the one or more oxyanions A with a charge n- include one or more of sulfate, chromate, carbonate, sulfite thiosulfate, selenate, selenite, molybdate, silicate, vanadate, arsenate, nitrite nitrate manganate, borate, iodite, iodate, formate, acetate, and propionate. Examples of monovalent anions with charge $1^-$ are hydroxide, chloride, fluoride, bromide, and iodide. Examples of trivalent metals are Fe(III), Mn(III), Ti(III), and Cr(III).

One or more ettringites can be formed by adding one or more bases and one or more aluminum salts to an aqueous fluid with dissolved oxyanions A. One or more trivalent metals M can also be in dissolved in the aqueous fluid, but this is not required since the aluminum salt can provide aluminum as the one or more trivalent metals M. Similarly, the ettringite calcium, or one or more divalent metals that replace all or part of the calcium, can be dissolved in the aqueous fluid or added as part of the one or more bases (which can be one or more of ammonium hydroxide, calcium oxide, calcium hydroxide, sodium hydroxide, magnesium hydroxide, lime, and slaked lime), and must be present in excess to form a precipitate. Under these conditions, ettringite can precipitate from the aqueous fluid, thereby decreasing the concentration of one or more of the ions that constitute the ettringite structure.

A serious drawback to these procedures is that the addition of one or more aluminum salts and one or more bases to the aqueous fluid adds additional anions to the aqueous fluid. For example, adding aluminum chloride as the aluminum salt and sodium hydroxide as the base increases the levels of chloride and sodium ions in the aqueous fluid. These additional ions often have to be removed from the aqueous fluid to make the aqueous fluid suitable for reuse or disposal. When the base is a liquid, such as slaked lime, the volume of the aqueous fluid can increase significantly upon addition of the liquid base, which adds to the amount of aqueous liquid that must be processed and disposed. When one or more aluminum salts are used, a stoichiometric excess of aluminum must be added, and not all of the aluminum in the one or more aluminum salts precipitate as part of the one or more ettringites. Often, this excess aluminum also has to be removed from the aqueous fluid. Another problem arises when the one or more ions to be removed from the aqueous fluid comprise sulfate. Ettringites comprising sulfate can have an aluminum to sulfate molar ratio if about 1 to about 1.5, or from about one to between about 1.5 and about 2. Although it is possible in theory to precipitate more than 2 mols of sulfate per mol of aluminum, this has not been reported. Since aluminum salts can be expensive, higher sulfate to aluminum ratios would be advantageous.

SUMMARY OF THE INVENTION

In some embodiments, the invention is directed to methods of removing one or more ions from an aqueous fluid comprising increasing the pH of the aqueous fluid and contacting the aqueous fluid with aluminum metal, thereby forming a precipitate comprising the one or more ions.

In various embodiments, increasing the pH of the aqueous fluid is carried out by adding one or more bases.

In particular embodiments, increasing the pH of the aqueous fluid is carried out by electrolysis.

In certain embodiments, the one or more ions comprise sulfate ions. In particular embodiments, the precipitate is an ettringite that comprises aluminum ions and sulfate ions. In specific embodiments, the ratio of sulfate ions to aluminum atoms in the ettringite is greater than 2:1, for example, 3:1.

DETAILED DESCRIPTION

All documents (e.g., patents, patent applications, journal articles, etc.) cited herein are incorporated by reference in their entirety for all purposes.

One or more ions can be removed from an aqueous fluid by a process comprising increasing the pH of the aqueous fluid containing one or more ions, and contacting the resulting pH-adjusted aqueous fluid with aluminum metal to form one or more precipitates. The one or more precipitates can be separated from the aqueous fluid, for example by decantation, filtration, etc. The pH of the remaining aqueous fluid can be further adjusted (e.g., neutralized) depending on the intended use of the remaining aqueous fluid.

The aqueous fluid can be any aqueous fluid containing one or more anions suitable for incorporation into ettringite, for example one or more of water, groundwater, mine drainings, mine tailings, mine dumps, culm dumps, tails, slimes, refuses, leach residue, waste fluid from in situ mining, impregnated fluid from in situ mining, waste fluid from heap mining, impregnated fluid from heap mining, waste fluid from a nuclear facility, such as a nuclear power generation facility or nuclear testing facility, municipal waste water, gangue-containing aqueous fluid, waste water from smelting facilities, waste water from pulp and paper mills, waste water from textile mills, and waste water from tanneries. The aqueous fluid can comprise, in addition to water, one or more liquids other than water, for example, one or more alcohols, such as ethanol, methanol, propanol, isopropanol, etc., glycerol, glycerin, dioxins, acetone, oil, grease, wax, petroleum, kerosene, benzene, toluene, xylene, poly(alkylene oxides), such as liquid poly(ethylene oxide), dissolved poly(ethylene oxide), liquid poly(ethylene glycol), dissolved poly(ethylene glycol), liquid poly(propylene oxide), dissolved poly(propylene oxide), liquid copolymers of ethylene oxide and propylene oxide, and dissolved copolymers of ethylene oxide and propylene oxide, turpentine, liquid surfactants, dissolved surfactants, alkyl acetates, such as ethyl acetate and butyl acetate, methyl ethyl ketone, diethyl ether, tetrahydrofuran, dimethyl sulfoxide, dimethyl formamide, plasticizers, (alk)acrylates, such as poly((meth)acrylate), copolymers of poly((meth)acrylate), poly(methyl (meth)acrylate), and copolymers of one or more poly(methyl (meth)acrylate)s, carbon tetrachloride, and chloroform.

The one or more ions can be any ions, for example, ions that can precipitate as components of one or more ettringites. Such ions can include one or more of halide anions, oxyanions, alkali-earth metal cations, and transition metal cations. Thus, the one or more ions can be one or more of sulfate, chromate, carbonate, sulfite, magnesium, calcium, thiosulfite, selenate, selenite, molybdate, silicate, vanadate, arsenate, chloride, bromide, iodide, fluoride, nitrite, nitrate, mangenate, borate, hypochlorite, chlorite, chlorate, perchlorate, iodite, iodate, bicarbonate, acetate, formate, cadmium, sulfamide, and hydroxide.

The precise nature and concentration of the one or more ions can depend, in part, on how the source of the aqueous fluid. One source of aqueous fluid is in situ leaching or heap leaching, for example, in situ leaching or heap leaching of uranium ore. In an in situ leaching process, an aqueous extraction liquid is injected into uranium ore, for example with one or more mining injectors known in the art, without removing the ore from the ground. The extraction liquid can be acidified with added sulfuric acid or made alkaline with added carbonate, depending on the nature of the ore and surrounding rock. The acidic or alkaline extraction liquid can dissolve the uranium-containing components of the ore, impregnating the extraction liquid with dissolved uranium. The extraction liquid can then be removed from the ground, for example with one or more mining extractors known in the art. Heap leaching, sometimes known as heap mining, is similar to in situ leaching except that the uranium ore is removed from the ground and placed in a heap above ground before contacting the acidic or alkaline extraction liquid.

The remaining aqueous fluid can have a high concentration of oxyanions, such as one or more of sulfate and carbonate. For example, when an acidic extraction liquid is used, the aqueous fluid can have a sulfate ion concentration of about 100 mg/L or more, or from about 100 mg/L to about 2,000 mg/L. Similarly, when an alkaline extraction liquid is used, the aqueous fluid can have a carbonate ion concentration of about 100 mg/L or more, or from about 100 mg/L to about 2,000 mg/L. In other cases, such as when an alkaline extraction liquid is used in conjunction with a sulfate-containing ore, the aqueous fluid can have a concentration of both sulfate and carbonate that are, for example, about 100 mg/L or more, or from about 100 mg/L to about 2,000 mg/L.

Mine tailings, for example acid mine tailings, can be another source of aqueous fluid. Mine tailings can include ions both from the ores being mined and from additives. Such ions can include one or more of sulfide, cadmium, fluoride, calcium, barium, mercury, cyanide, sulfamide, iron, hydroxide, aluminum, sodium, titanium, and sulfate. Sulfur containing ions, such as sulfate, are particularly common in mine tailings, especially when the ore contains one or more of iron sulfide, barite, epsomite, and gypsum.

Increasing the pH of the aqueous fluid can comprise increasing the pH to about 9.0 or greater, such as to about 10 or greater, about 11 or greater, about 12 or greater, from about 10 to about 13, or from about 11.5 to about 13. Increasing the pH of the aqueous fluid can also comprise increasing the pH to about 9.1, about 9.2, about 9.3, about 9.4, about 9.5, about 9.6, about 9.7, about 9.8, about 9.9, about 10.0, about 10.1, about 10.2, about 10.3, about 10.4, about 10.5, about 10.6, about 10.7, about 10.8, about 10.9, about 11.0, about 11.1, about 11.2, about 11.3, about 11.4, about 11.5, about 11.6, about 11.7, about 11.8, about 11.9, about 12.0, about 12.1, about 12.2, about 12.3, about 12.4, about 12.5, about 12.6, about 12.7, about 12.8, about 12.9, about 13.0, about 13.1, about 13.2, about 13.3, about 13.4, about 13.5, about 13.6, about 13.7, about 13.8, about 13.9, about 14.0, or to one or more ranges defined by any two of the above-mentioned values. For example, when increasing the pH comprises increasing the pH to about 12 or greater, the resulting aqueous fluid can be biologically disinfected much in the same way as disinfecting can be accomplished by treatment with bleach.

Increasing the pH of the aqueous fluid can be accomplished by any suitable method. For example, the pH can be increased by one or more of contacting the aqueous fluid with one or more bases, and electrolyzing the aqueous fluid. When increasing the pH comprises contacting aqueous fluid with one or more bases, the one or more bases can be, for example, one or more of solid base, a basic solution, and a basic suspension. The one or more bases can comprise one or more alkali metal or alkaline earth hydroxide salts or oxides, for example, one or more of sodium hydroxide, sodium oxide potassium hydroxide, potassium oxide calcium hydroxide, calcium oxide, as well as ammonium hydroxide, and metallic hydroxides or oxides such as magnesium hydroxide and magnesium oxide. Solutions and suspensions containing one or more of the above-mentioned hydroxide salts, or solutions and suspensions of metal oxides can also be used. The base can be in the form of a raw material, such as lime or lye, for example, solutions or suspensions of one or more of lime and lye, such as hydrated lime.

The one or more bases can be added in one or more mixing chambers. Mixing chambers can include vessels constructed to hold the aqueous liquid, or alternatively can include structures such as settlement ponds, etc. containing the aqueous liquid. The one or more mixing chambers can be in any location where one or more bases are added; other process steps in addition to adding the one or more bases can also take place in the one or more mixing chambers. The one or more mixing chambers can comprise one or more mixing elements for mixing the base with the aqueous fluid. When the base comprises a solid, mixing with the one or more mixing elements can dissolve all or part of the solid base in the aqueous fluid, although this is not required unless otherwise specified. The one or more mixing elements can include one or more of paddle mixers, impellers, such as mixed flow impellers, turbine mixers, such as curved blade turbines, and radial blade turbines, vortex mixers, agitators, such as gear driven agitators, drum mixers, and stirrers.

The one or more bases, such as hydrated lime, can be added to the aqueous fluid in the one or more mixing chambers until the aqueous fluid is saturated and residual solids of the one or more bases, such as solid calcium hydroxide, are present in the one or more mixing chambers. The residual solids can then be settled for example, for separation from the aqueous fluid.

Increasing the pH of the aqueous fluid can comprise electrolyzing the aqueous fluid. Electrolyzing the aqueous fluid can comprise electrolyzing with one or more electrodes, and can take place within one or more electrolyzing chambers. The one or more electrolyzing chambers can be any location where electrolyzing takes place; other process steps in addition to electrolyzing can also take place within the one or more electrolyzing chambers.

The one or more electrodes can comprise one or more electrosorptive electrodes, which can be disposed inside the one or more electrolyzing chambers such that the electrodes are in contact with the aqueous fluid. The one or more electrosorptive electrodes can comprise one or more of an anode and a cathode. As an example, one or more anodes can comprise electrosorptive electrodes and one or more cathodes can comprise non-electrosorptive electrodes; one or more anodes can comprise non-electrosorptive electrodes and one or more cathodes can comprise electrosorptive electrodes, or both one or more anodes and one or more cathodes can comprise electrosorptive electrodes. Typically, one or more anodes comprise electrosorptive electrodes, and one or more cathodes comprise non-electrosorptive electrodes, although this is not required unless otherwise specified.

Electrosorptive electrodes can be porous, and can contain one or more electrosorptive materials. The one or more electrosorptive materials can include, for example, one or more conductive carbon materials, such as one or more of activated carbon, carbon aerogel, reticulated vitreous carbon, and pyrolized resorcinol formaldehyde resin, one or more metal carbides, such as one or more of TiC, ZrC, VC, NbC, TaC, UC, MoC, WC, $MO_2C$, $Cr_3C$, and $Ta_2C$, one or more metals such as Cu, Ag, Fe, Ni, Au, Al, Ni, Pt, and Zn, and one or more steel material, such as stainless steel. The electrosorptive material can be surface modified, for example, by surfactant adsorption. The electrosorptive material can be in any suitable form, for example, one or more of granules, powders, sheets, and porous monoliths.

When the one or more electrosorptive materials comprise one or more granules or powders, the one or more granules or powders can be arranged in a layer between one or more porous members and one or more substrates. The one or more porous members can have a pore size that is smaller than the particle size of the one or more granules or powders. One or more compression elements, such as an inflatable bladder, pump, press, or the like, can be associated with the one or more electrosorptive electrodes for maintaining a pressure on the porous member or the substrate and for retaining the one or more granules or powders between the porous member and the substrate. In this arrangement, no binder or glue for affixing the one or more electrosorptive granules or powders to each other and/or the substrate is needed. The one or more compression element can also release the pressure on the one or more porous members or the one or more substrates to release the one or more powders or granules. Upon release, the one or more powders or granules can be moved, for example by blowing or application of partial vacuum, to one or more wash chambers where they can be washed with one or more of an acid and a base. After washing, the one or more powders or granules can be moved back in place between the porous member and the substrate. One or more of the one or more electrolyzing chambers can include a plurality electrosorptive electrodes of this type, so that when the granules or powder of electrosorptive material from one electrosorptive electrode are being washed, other electrosorptive electrodes can continue operating and the electrolyzing process can continue without interruption.

Particular electrosorptive electrodes and electrolyzing chambers containing electrosorptive electrodes are described in U.S. Pat. No. 5,954,937, which is herein incorporated by reference in its entirety for all purposes, U.S. Pat. Pub. 2009/0045074, which is herein incorporated by reference in its entirety for all purposes, and U.S. Pat. Pub. 2008/0078673, which is herein incorporated by reference in its entirety for all purposes. However, no particular electrodes or electrolyzing chambers are required for any particular embodiment of the process of the present invention unless otherwise specified.

When one or more non-electrosorptive electrodes are used, they can be any non-electrosorptive electrodes known in the art. For example, the one or more non-electrosorptive electrodes can comprise one or more non-porous electrode materials, such as stainless steel, iron, titanium, conductive carbon, copper, silver, gold, and platinum.

Figure 1:
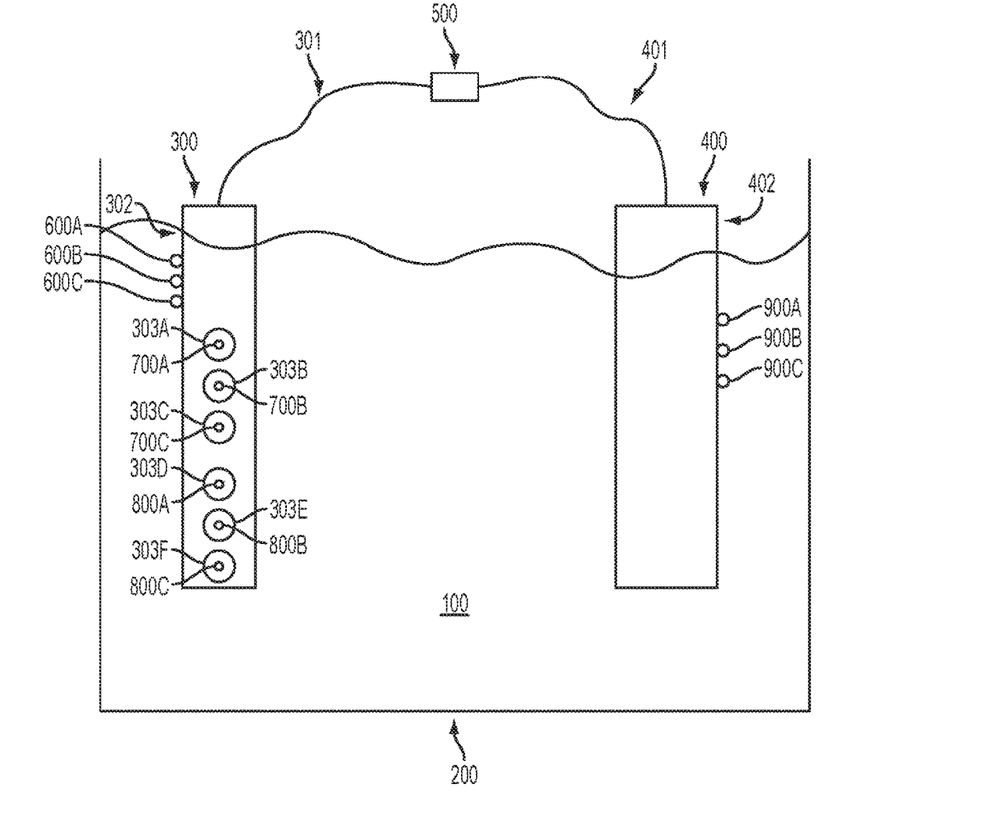
FIG. 1 is an exemplary electrolyzing chamber for increasing the pH of an aqueous fluid.

FIG. 1 is a diagram showing an example of increasing the pH of an aqueous fluid 100 by electrolyzing the aqueous fluid 100 that contacts a porous electrosorptive anode 300 and non-porous, non-electrosorptive cathode 400 in electrolyzing chamber 200. The porous electrosorptive anode 300 and non-porous, non-electrosorptive cathode 400 are both electrically connected to power source 500 by, respectively, anode connector 301 and cathode connector 401. The power source 500 provides a potential difference between the porous electrosorptive anode 300 and non-porous, non-electrosorptive cathode 400 across aqueous fluid 100. The potential difference can be sufficient to electrolyze the water in aqueous fluid 100, for example, about 1 V or greater, about 1.5 V or greater, about 1.8 V or greater, about 2 V or greater, or about 2.5 V or greater.

When the potential difference is sufficient to electrolyze water, hydrogen or hydronium ions 600A, 600B, and 600C associated with the porous electrosorptive anode 300 can form on surface 302 of the porous electrosorptive anode 300. At the same time, negative ions 700A, 700B, and 700C, from the aqueous fluid 100 are attracted to the porous electrosorptive anode 300 and accumulate in pores 303A, 303B, and 303C of the porous electrosorptive anode 300. Negative ions 700A, 700B, and 700C can be, for example, one or more of sulfate, bisulfate, chloride, nitrate, phosphate, hydrogen phosphate, dihydrogen phosphate, and carbonate. Acids 800A, 800B, and 800C, which can be any acid but are typically Arrhenius acids such as one or more of $H_2SO_4$, HCl, $HNO_3$, $H_2CO_3$, and $H_3PO_4$, can be formed inside pores 303D, 303E, and 303F when hydrogen or hydronium ions 600A, 600B, and 600C migrate into the porous structure of the porous electrosorptive anode 300 and react with negative ions 700A, 700B, and 700C. The acids

800A, 800B, and 800C can be captured within the pores 303D, 303E, and 303F of the porous electrosorptive anode 300. When acids 800A, 800B, and 800C are captured within the porous electrosorptive anode 300, they cannot migrate into the aqueous fluid 100.

At the same time, hydroxide ions 900A, 900B, and 900C, which are associated with non-porous, non-electrosorptive cathode 400, can form on surface 402 of the non-porous, non-electrosorptive cathode 400. Because the non-porous, non-electrosorptive cathode 400 is not electrosorptive, the hydroxide ions can migrate into the aqueous fluid 100.

Electrolyzing as described above with reference to FIG. 1 can create equal numbers of hydrogen or hydronium ions 600A, 600B, and 600C and hydroxide ions 900A, 900B, and 900C. The hydrogen or hydronium ions 600A, 600B, and 600C can form acids 700A, 700B, and 700C, which are captured in the porous structure of the porous electrosorptive anode 300, whereas the hydroxide ions 900A, 900B, and 900C can migrate into the aqueous fluid 100. In this way, electrolyzing can provide an excess of hydroxide ions 900A, 900B, and 900C in the aqueous fluid 100, thereby increasing the pH of the aqueous fluid 100.

After the pH of the aqueous fluid is increased, the aqueous fluid can be transferred to one or more reactor chambers and contacted with aluminum metal. As discussed above, conventional methods of forming ettringite involve reacting solutions of oxyanions with solutions of trivalent metal ion salts (e.g. aluminum salts), and a base (e.g. a metal hydroxide such as calcium hydroxide). However, this process results in relatively high fluid volumes as well as high levels of the various items introduced in the various solutions. In contrast, adding aluminum in the form of a metal reduces the fluid volume substantially, as well as eliminates the introduction of additional ions (i.e., the counterions introduced with the aluminum salt solution). The resulting process is substantially more economical than conventional processes due to the reduced costs associated with handling lower fluid volumes and lower ion levels.

The one or more reactor chambers can be any location where the aqueous fluid is contacted with aluminum metal; other physical or chemical processes can also take place in the one or more reactor chambers. The one or more reactor chambers can be the same as the one or more mixing chambers or the one or more electrolyzing chambers. In that case, all of the processing steps for removing ions from the aqueous fluid can be carried out in the same chamber. However, this is not required unless otherwise specified, and the various process steps, such as increasing the pH of the aqueous fluid and contacting the aqueous fluid with aluminum metal can be carried out in separate mixing or electrolyzing and reactor chambers. It is also possible to carry out particular combinations of processing steps in the same one or more chambers, other processing steps are carried out in one or more separate chambers, such as one or more reaction chambers, mixing chambers, or electrolyzing chamber.

The aluminum metal can comprise any type of aluminum metal material, for example, one or more of aluminum scrap, aluminum pellets, aluminum shot, recycled aluminum-based household products, such as aluminum containing cans, tins, and foils, aluminum flakes, and aluminum turnings. The aluminum metal and aluminum metal material need not be pure aluminum, but may include aluminum mixed with other materials such as one or more aluminum oxides. The aluminum metal can be pre-loaded into the reactor chamber before the addition of the aqueous fluid to the reactor chamber, added to the reactor chamber after the addition of the aqueous fluid, or partially pre-loaded and partially added to the reactor chamber after the addition of the aqueous fluid.

The aluminum metal can also be in the form of one or more aluminum electrodes, such as non-porous, non-electrosorptive cathodes 400. Use of one or more aluminum electrodes can be particularly convenient when the pH of the aqueous liquid is increased by electrolyzing the aqueous liquid, although it is not limited to that use. In that case, one or more the electrolyzing chambers and the one or more reactor chambers can be the same one or more electrolyzing and reactor chambers. The one or more aluminum electrodes can be sacrificial electrodes that are consumed during one or more of the electrolyzing step and the forming one or more precipitates step.

The one or more reactor chambers can comprise one or more reactor mixing elements for mixing the aluminum metal with the aqueous fluid. The one or more reactor mixing elements can include one or more of paddle mixers, impellers, such as mixed flow impellers, turbine mixers, such as curved blade turbines, and radial blade turbines, vortex mixers, agitators, such as gear driven agitators, drum mixers, and stirrers. The one or more reactor mixing elements can operate at sufficient speed to dislodge the one or more precipitates from the surface of the aluminum metal. Importantly, as mentioned above, the one or more reactor chambers can be the same as the one or more mixing chambers or the one or more electrolyzing chambers. In this case, the one or more combined reactor and mixing chambers or one or more combined reactor and electrolyzing chambers can use the same mixing elements, or different mixing elements. For example, particular mixing elements may be operated when adding base and the same or different mixing elements may be operated when reacting with aluminum.

A coating, for example of the one or more precipitates, can form on the surface of the aluminum metal in the reactor chamber. This coating can prevent the aluminum metal from contacting the contents of the aqueous fluid. Thus, one or more inert materials can be added to the one or more reactor chambers to abrade the surface of the aluminum metal and remove some or all of the coating. The one or more inert materials can also provide nucleation sites for forming the one or more precipitates. The one or more inert materials can be in any suitable form, such as chips, flakes, pellets, and spheres, and may comprise any suitable material, such as one or more of carbon, for example glassy carbon, glass, ceramic, for example, low silicon alumina ceramic, and plastic, such as poly(tetrafluoroethylene) plastic.

In use, the aluminum metal can be oxidized by the aqueous fluid at an increased pH, such as the increased pH levels discussed above, to form aluminum ions. Aluminum ions, typically Al(III) cations, can dissolve in the aqueous fluid and react with other contents of the aqueous fluid to form one or more precipitates in the one or more reactor chambers.

The one or more precipitates can comprise any materials that precipitate from the aqueous fluid upon addition of aluminum at increased pH. Ions, such as one or more of chloride, fluoride, bromide, iodide, chromate, selenate, borate, carbonate, Fe(II), Fe(III), Mn(III), Ti(III), Cr(III), calcium, magnesium, lead, cadmium, zinc, sulfate, chromate, carbonate, sulfite thiosulfate, selenate, selenite, molybdate, silicate, vanadate, arsenate, nitrite nitrate manganate, borate, iodite, iodate, formate, acetate, and propionate, can be part of the one or more precipitates. For example, the one or more precipitates can comprise one or more of copper salts, such as copper sulfate, copper hydrox- ide, and copper carbonate, zinc salts, such as zinc sulfate and zinc hydroxide, and iron salts, such as iron sulfate. The one or more precipitates can also comprise one or more ettringite, such as any of the ettringites discussed above.

As an example, aluminum can oxidize at increased pH in the presence of calcium hydroxide by the following reaction, which is shown as a forward reaction but can be reversable under certain conditions:

$$2Al+Ca(OH)_2+6H_2O \rightarrow 2Al(OH)_4^- + Ca^{2+} + 3H_2$$

When the above-mentioned reaction occurs in the presence of sulfate anions, an etteringite can form. An exemplary etteringite-forming reaction, which is shown as a forward reaction but can be reversable under certain conditions, is:

$$6Ca^{2+} + 2Al(OH)_4^- + 3SO_4^{2-} + 4OH^- + 26H_2O \rightarrow Ca_6(Al(OH)_6)_2(SO_4)_3 \cdot 26H_2O$$

Neither of the above-mentioned reactions are limiting unless otherwise specified, as other aluminum-oxidizing and ettringite-forming reactions can occur depending on the precise pH used and the specific ions present.

When the one or more precipitates comprise ettringite, the ettringite can have a molar ratio of sulfate to aluminum of about 2 or greater, for example from about 2 to about 3, or about 3. In order to form an ettringite precipitate, calcium ions must be present in the aqueous fluid. Some aqueous fluids, for example certain mine tailings, contain sufficient calcium to form an ettringite. If calcium ions are not initially present in the aqueous fluid, they can be added, for example, by adding calcium hydroxide or lye to the aqueous fluid during the step of increasing the pH of the aqueous fluid.

The one or more precipitates can be separated from the aqueous fluid. Separation of the one or more precipitates from the aqueous fluid can be accomplished by any means, for example, one or more of flotation, filtration, centrifuging, and settling. When flotation is used, it can comprise dissolved air flotation, among other flotation techniques. Filtration can be accomplished with any suitable filtration device, for example, one or more of sand filters, canister filters, cartridge filters, and belt filters. Belt filters are commonly used in the mining industry, but are not required unless otherwise specified. Settling can comprise any one or more settling techniques, for example, one or more of adding one or more upflow clarifiers, settling with one or more tube settlers, settling with one or more plate settlers, adding one or more thickeners, such as thickening polymers like acrylamide polymers and copolymers, and adding one or more rigidifying materials. Centrifuging can be accomplished with any one or more centrifuges, for example one or more of fixed angle centrifuges, swinging head centrifuges, continuous tubular centrifuges, ultracentrifuges, screen centrifuges, screen-roll centrifuges, pusher centrifuges, peeler centrifuges, decanter centrifuges, and continuous liquid centrifuges, such as solid bowl centrifuges and liquid plate centrifuges. Centrifuging can produce a cake of the one or more precipitates, for example, one or more ettringites, and a liquid concentrate.

After separation of the one or more precipitates, the pH of the remaining aqueous fluid can be adjusted, for example, to from about 6 to about 8, for example to about 6.1, about 6.2, about 6.3, about 6.4, about 6.5, about 6.6, about 6.7, about 6.8, about 6.9, about 7.0, about 7.1, about 7.2, about 7.3, about 7.4, about 7.5, about 7.6, about 7.7, about 7.8, about 7.9, about 8.0, or to one or to one or more ranges defined by any of the above pH values Adjusting the pH of the remaining aqueous fluid can be accomplished by any method, for example, by one or more of contacting the remaining aqueous fluid with one or more acids and contacting the remaining aqueous fluid with carbon dioxide. When adjusting the pH comprises contacting the remaining aqueous fluid with carbon dioxide, the carbon dioxide can be a solid or a gas. When carbon dioxide is used, the volume of the remaining aqueous fluid can increase by only a trivial amount, thus minimizing the additional volume of aqueous fluid for disposal.

After pH-adjustment, the remaining aqueous fluid can be discharged to any suitable location. The suitable location will depend on the contents of the remaining aqueous fluid, the applicable regulations governing discharge of aqueous fluids, and the intended use of the remaining aqueous fluid. For example, the remaining aqueous fluid can be discharged to a suitable aquifer, for example, by using one or more mining injectors such as those discussed above with respect to in situ leaching. If appropriate, the remaining aqueous fluid can be discharged into a water system, such as a municipal waste water or drinking water system. As another example, if the remaining aqueous fluid is considered dangerous, for example, because it has unacceptably high radioactivity levels, then it can be discharged directly to an appropriate storage or decontamination facility or to appropriate containers for later transportation to an appropriate storage or decontamination facility.

The process of the present invention can be carried out in a batch, semi-batch, or continuous mode. For example, in batch mode, a defined amount of aqueous fluid containing ions to be removed (e.g., oxyanions which can precipitate as a component of one or more ettringites) is treated, either electrolytically or by addition of base, to increase the pH. The pH-adjusted aqueous medium is then contacted with aluminum metal to form an ettringite precipitate. The ettringite precipitate can then be recovered by one or more processes such as floatation, filtration, decantation, centrifugation, etc.

Alternatively, in continuous mode, a stream of aqueous liquid is continuously pH-adjusted, either by addition of base or electrolytically, to form a pH-adjusted aqueous liquid, which is then contacted with aluminum metal to form an ettringite precipitate, which is continuously removed.

In semi-batch mode, a defined amount of aqueous liquid can be treated continuously, as described herein, all of the process itself may be interrupted between treatments of individual batches of aqueous liquid.

Example 1

Samples of aqueous fluids from three different sources were tested for sulfate content. Sample 1 was obtained from ground water near Pueblo, Colo., sample 2 from ground water in Arizona, and sample 3 from the Arkansas River near Pueblo, Colo. The initial concentration of sulfate in each sample was measured.

Hydrated lime was added to each sample to increase the pH of each sample to 12.4. One liter of each sample was placed in a 2 L beaker and mixed with a magnetic stirring bar. Three grams of aluminum metal, in the form of scrap machine turings, was added to each beaker. A precipitate formed in each beaker upon or shortly after the addition of aluminum. Each sample was stirred for a pre-determined amount of time, after which the stirring was turned off and the solid contents of the beakers was allowed to settle. An aliquot of each treated sample was collected, filtered, and tested for sulfate concentration.

The results of this experiment are shown in Table 1.

TABLE 1

| | Sulfate concentration before treatment | Sulfate Concentration after Treatment | Treatment time |
|---|---|---|---|
| Sample 1 | 1800 mg/L | 150 mg/L | 2.0 hours |
| Sample 2 | 1450 mg/L | 100 mg/L | 2.0 hours |
| Sample 3 | 125.0 mg/L | 50 mg/L | 0.50 hours |

Table 1 shows that the sulfate concentration of each sample was reduced upon treatment. For those samples having the highest concentrations of sulfate, the decrease was over 10-fold. This result is unexpected, because no aluminum salt or other metal salt was added to any of the aqueous fluids.

Importantly, although specific examples are discussed above in great detail, those examples are not limiting unless otherwise specified. For example, while certain processes are explained in the context of removing sulfate ions, other ions can also be removed.

The invention claimed is:

1. A method of removing one or more oxyanions from an aqueous liquid, comprising increasing the pH of the aqueous liquid comprising the one or more oxyanions; and
    contacting the pH-increased aqueous liquid with aluminum metal thereby forming one or more precipitates comprising aluminum and the one or more oxyanions, wherein the one or more precipitates comprises one or more ettringites.

2. The method of claim 1, wherein increasing the pH of the aqueous liquid comprises increasing the pH to about 10 or greater.

3. The method of claim 1, wherein increasing the pH of the aqueous liquid comprises increasing the pH to from about 10 to about 11.

4. The method of claim 1, wherein increasing the pH of the aqueous fluid comprises contacting the aqueous liquid with a base.

5. The method of claim 4, wherein the base comprises one or more of a solid, a solution, and a suspension.

6. The method of claim 4, wherein the base comprises one or more of sodium hydroxide, potassium hydroxide, calcium hydroxide, ammonium hydroxide, and magnesium hydroxide.

7. The method of claim 1, wherein increasing the pH of the aqueous liquid comprises electrolyzing the aqueous liquid.

8. The method of claim 7, wherein electrolyzing the aqueous liquid comprises at least one of electrolyzing with one or more electrosorptive cathodes and electrolyzing with one or more electrosorptive anodes.

9. The method of claim 7, wherein electrolyzing the aqueous liquid comprises electrolyzing with one or more porous, electrosorptive anodes and one or more non-porous, non-electrosorptive cathodes.

10. The method of claim 7, wherein electrolyzing the aqueous fluid comprises electrolyzing at a voltage of about 1 V or greater.

11. The method of claim 7, wherein electrolyzing the aqueous liquid comprises electrolyzing at a voltage of about 1.8 V or greater.

12. The method of claim 7, wherein electrolyzing the aqueous liquid comprises producing one or more hydrogen or hydronium ions associated with one or more porous, electrosorptive anodes.

13. The method of claim 12, wherein one or more acids are formed and immobilized in the one or more porous, electrosorptive anodes.

14. The method of claim 7, wherein electrolyzing the aqueous liquid further comprises forming one or more hydroxide ions associated with one or more non-porous, non-electrosorptive cathodes.

15. The method of claim 9, wherein the at least one non-porous, non-electrosorptive cathodes comprise one or more of stainless steel, iron, titanium, conductive carbon, copper, silver, gold, and platinum.

16. The method of claim 7, wherein electrolyzing the aqueous liquid comprises electrolyzing with one or more porous, electrosorptive anodes comprising one or more porous members;
    one or more substrates;
    one or more electrosorptive materials in the form of granules or powders disposed between the one or more porous members and one or more substrates.

17. The method of claim 16, wherein the one or more electrosorptive materials comprise or more of conductive carbon materials, metal carbides, metals, and steels.

18. The method of claim 16, wherein the one or more electrosorptive materials comprise one or more of activated carbon, reticulated vitreous carbon, carbon aerogel, and pyrolyzed resorcinol formaldehyde resin.

19. The method of claim 1, wherein the aluminum metal comprises one or more of aluminum scrap, aluminum pellets, aluminum shot, aluminum household products, aluminum flakes, and aluminum turnings, wherein the aluminum household products comprise aluminum-containing cans, tins, and foils.

20. The method of claim 1, wherein contacting the pH increased aqueous liquid with aluminum metal comprises mixing the pH increased aqueous liquid with one or more mixing elements to dislodge precipitate from the surface of the aluminum metal.

21. The method of claim 20, wherein the one or more mixing elements comprises one or more of paddle mixers, impellers, turbine mixers, vortex mixers, agitators, drum mixers, and stirrers.

22. The method of claim 1, wherein the aluminum metal comprises one or more aluminum electrodes.

23. The method of claim 1, wherein the one or more oxyanions comprise one or more of chromate, selenate, borate, carbonate, sulfate, sulfite, thiosulfite, selenite, molybdate, silicate, vanadate, arsenate, nitrite, nitrate, manganate, iodite, iodate, formate, acetate, and propionate.

24. The method of claim 1, wherein the one or more oxyanions comprise sulfate.

25. The method of claim 1, wherein the one or more precipitates further comprise one or more of copper sulfate, copper hydroxide, copper carbonate, zinc sulfate, zinc hydroxide, and iron sulfate.

26. The method of claim 1, wherein the one or more ettringites comprise sulfate.

27. The method of claim 26, wherein the one or more ettringites comprise a molar ratio of aluminum to sulfate to greater of about 1 to greater than 2.

28. The method claim 26, wherein the one or more ettringites comprise a molar ratio of aluminum to sulfate of about 1 to about 3.

29. The method of claim 1 further comprising separating the one or more precipitates from the aqueous liquid.

30. The method of claim 29, wherein separating the one or more precipitates from the aqueous liquid comprises one or more of flotation, filtration, centrifugation, and settling.

31. The method of claim 30, wherein when the separating the one or more precipitates from the aqueous fluid comprises settling, the settling comprises one or more of the following: one or more upflow clarifiers, one or more tube settlers, one or more plate settlers, adding one or more thickeners, and adding one or more rigidifying materials.

32. The method of claim 1 further comprising adjusting the pH of the aqueous liquid after forming the one or more precipitates.

33. The method of claim 32, wherein adjusting the pH of the aqueous liquid after forming one or more precipitates comprises adjusting the pH to from about 6 to about 8.

34. The method of claim 32, wherein adjusting the pH of the aqueous liquid after forming one or more precipitates comprises contacting the aqueous liquid with one or more acids.

35. The method of claim 32, wherein adjusting the pH of the aqueous liquid after forming one or more precipitates comprises contacting the aqueous liquid with carbon dioxide.

* * * * *

UNITED STATES PATENT AND TRADEMARK OFFICE
CERTIFICATE OF CORRECTION

PATENT NO. : 9,656,887 B2  
APPLICATION NO. : 14/061544  
DATED : May 23, 2017  
INVENTOR(S) : Elson et al.

Page 1 of 1

It is certified that error appears in the above-identified patent and that said Letters Patent is hereby corrected as shown below:

In the Claims

At Claim 4, Column 11, Line 39, please replace "fluid" with --liquid--.

At Claim 10, Column 11, Line 59, please replace "fluid" with --liquid--.

At Claim 17, Column 12, Line 21, please replace "comprise or" with --comprise one or--.

At Claim 31, Column 13, Line 2, please replace "fluid" with --liquid--.

Signed and Sealed this  
Third Day of October, 2017

Joseph Matal  
*Performing the Functions and Duties of the*  
*Under Secretary of Commerce for Intellectual Property and*  
*Director of the United States Patent and Trademark Office*